United States Patent [19]

Lai

[11] Patent Number: 5,183,682
[45] Date of Patent: Feb. 2, 1993

[54] LOW MOISTURE HOT ROLLING PROCESS AND PRODUCT

[75] Inventor: Chron-Si Lai, Harrisburg, Pa.

[73] Assignee: Hershey Foods, Hershey, Pa.

[21] Appl. No.: 415,095

[22] Filed: Sep. 29, 1989

[51] Int. Cl.$^5$ .............................................. A23L 1/18
[52] U.S. Cl. .................................... 426/636; 426/449; 426/455; 426/459; 426/466; 426/468; 426/620; 426/621
[58] Field of Search ............... 426/449, 459, 466, 468, 426/455, 620, 621, 636

[56] References Cited

U.S. PATENT DOCUMENTS

| | | | |
|---|---|---|---|
| 1,990,382 | 2/1935 | Kellogg | 426/309 |
| 2,181,372 | 11/1939 | Kellogg | 426/449 |
| 2,610,124 | 9/1952 | Roberts | 426/450 |
| 2,643,951 | 6/1953 | Alderman et al. | 426/625 |
| 2,715,579 | 8/1955 | Roberts | 426/450 |
| 2,808,333 | 10/1957 | Mickus et al. | 99/80 |
| 3,085,013 | 4/1963 | Wayne | 426/314 |
| 3,453,115 | 7/1969 | Clausi et al. | 99/81 |
| 3,458,322 | 7/1969 | Kelley et al. | 426/448 |
| 3,660,110 | 5/1972 | Holtz, Jr. et al. | 99/81 |
| 4,166,868 | 9/1979 | Ando et al. | 426/508 |
| 4,333,960 | 6/1982 | Barry et al. | 426/625 |
| 4,623,546 | 11/1986 | Holay et al. | 426/449 |

FOREIGN PATENT DOCUMENTS 8605953 10/1986 Australia.

Primary Examiner—Jeanette Hunter
Assistant Examiner—Helen Pratt
Attorney, Agent, or Firm—Scully, Scott, Murphy & Presser

[57] ABSTRACT

The present invention relates to a low moisture hot rolling process for preparing expanded grain products without the extended time or high energy requirements of prior art processes. More particularly, the present process comprises wetting parboiled grain to a moisture content of between 8-16%; optionally tempering the moistened grain; plasticizing the moistened grain; compressing the moistened grain to reduce kernel thickness; and, toasting the compressed grain to obtain an improved expanded grain product.

25 Claims, 3 Drawing Sheets

PARBOILED RICE
↓ ← SOLUTION CONTAINING: SALTS (CHLORIDES, PHOSPHATES, SULFATES, CITRATES, BISULFITES), SUGARS.
MIX IN A BATCH OR CONTINUOUS MIXER (8-16% MOISTURE)
↓
TEMPER (OPTIONAL)
↓
MICROWAVE
↓
BUMPING
↓
TEMPER (OPTIONAL)
↓
TOASTING OVEN
↓
FINAL PRODUCT

LOW MOISTURE HOT ROLLING PROCESS AND PRODUCT

BACKGROUND OF THE INVENTION

The present invention relates to a process for manufacturing expanded grain products without extended time or high energy requirements. More specifically, the present invention is directed to a low moisture hot rolling process for preparing expanded grain products.

Processes to make expanded grain products can be divided into three categories: extrusion, sudden pressure drop and oven puffing or toasting processes. The extrusion process involves feeding a mixture of moistened grain flour, flavorings and colorings into a cooker extruder. The mixture is thoroughly cooked into a plastic mass which expands when exiting the die. The cooking temperature can be adjusted so that the extrudate exits the die as a translucent dense glass which will expand when heated in hot oil or hot air. The process requires a high capital investment and is energy intensive.

The sudden pressure drop process involves heating the grain in a closed chamber to the desired temperature then rapidly releasing the pressure which has built up inside the chamber. This process can be modified so that the grain is heated in an open chamber then transferred to a closed chamber prior to applying a vacuum to induce expansion. This type of process requires a high capital investment for special equipment and is very expensive to operate.

The present invention belongs to the oven puffing or toasting category. The oven puffing process can be subdivided into two groups: those with and those without bumping treatment. Bumping is a process whereby the grain or kernel thickness is reduced by some physical means, e.g. compression. Examples of preparing rice products with no bumping treatment are clearly shown in U.S. Pat. Nos. 2,715,579; 2,610,124; 2,808,333; and 3,085,013. These processes employ various methods to heat the parboiled grain or pregelatinized grain to induce a low degree of expansion.

In most of the prior art processes that employ a bumping step, the grain is steamed in a rotary cooker to gelatinize the starch and increase the grain moisture content. The cooked grain is then rolled with or without a partial drying step, and then the bumped grain is dried at a fairly low temperature to reduce the moisture content of the grain to about 11%–15% moisture. The dried grain is then tempered for no less than 15 hours prior to puffing in the oven or a stream of hot air.

Australian Patent International Publication Number WO 86/05953, describes a process which involves wetting the parboiled grain with a solution containing a diastase(s) and/or a proteolytic enzyme(s), salt or sugar. The moistened grain was held at temperatures below the starch gelatinization temperature to allow uniform redistribution of the added water. The tempered grain (23% moisture) was bumped and dried to 12%–15% moisture. The partially dried grain was allowed to rest and then toasted in the oven. Examples given in the patent used several days of rest time. The authors claimed that tempering and bumping the grain at temperatures below the starch gelatinization temperature plus the use of enzyme(s) produce crisped grain with superior quality.

The present invention involves wetting the parboiled grain preferably to a moisture content of about 8%–16% using a solution containing salts e.g. phosphates, citrates, chlorides, sulfates and the like, and sugars e.g. corn syrups, sucrose and the like. The moistened grain is then tempered. Tempering is a process whereby uniform distribution of moisture throughout the grain is achieved. The required tempering time is a function of tempering temperature.

Satisfactory crisped rice can be obtained using about 20 minutes tempering at about 50° C. The tempered rice is plasticized using heat then bumped to reduce the kernel thickness. The heating has to be carried out in a short time to minimize moisture loss. The desired temperature for rolling is inversely proportional to the rice moisture content. The bumped grain can be toasted with or without resting to obtain expanded products.

SUMMARY OF THE INVENTION

The process of the present invention produces a high yield, high grade expanded grain product without the high energy and time requirements inherent in conventional processes. In accordance with the present invention, parboiled grain is wetted preferably to a moisture content of between about 8%–16%. The moistened grain is then tempered to allow uniform distribution of moisture. The tempering solution may contain various edible salts, e.g. phosphates, citrates, chlorides, sulfates and the like, and edible sugars, e.g. corn syrups, glucose, fructose, lactose, maltose, galactose, xylose, sucrose and the like. Optionally, wetting and tempering may be performed in the same step. The tempered rice is then plasticized to soften the grains to make them suitable for bumping. Microwave energy is preferably employed to plasticize the grain. Other forms of energy such as dielectric heating and thermal energy can also be effectively employed. The heating step must be carried out so that there is no severe loss of moisture. The bumped grain can be toasted with or without resting to obtain a superior expanded grain product.

The present invention is particularly characterized by the elimination of a drying step to prepare the grain for bumping or toasting. In the prior art, bumped grains require a drying step to reduce the moisture content to the range of 11%–15% suitable for puffing. The present process does not require this drying step because the grain is already at about the 11%–15% moisture content range when bumped. The present invention is further characterized by the substantial reduction in the required rest time. The present process uses less than about 30 minutes rest time while the prior art requires no less than 15 hours. The present invention is further characterized by employing various salts to enhance expansion of the crisped products. The added salts were particularly found to enhance the efficiency of absorbing microwave energy, thus reducing the surface drying and cooling when the grain is microwave treated.

DETAILED DESCRIPTION OF THE INVENTION

Figure 1:
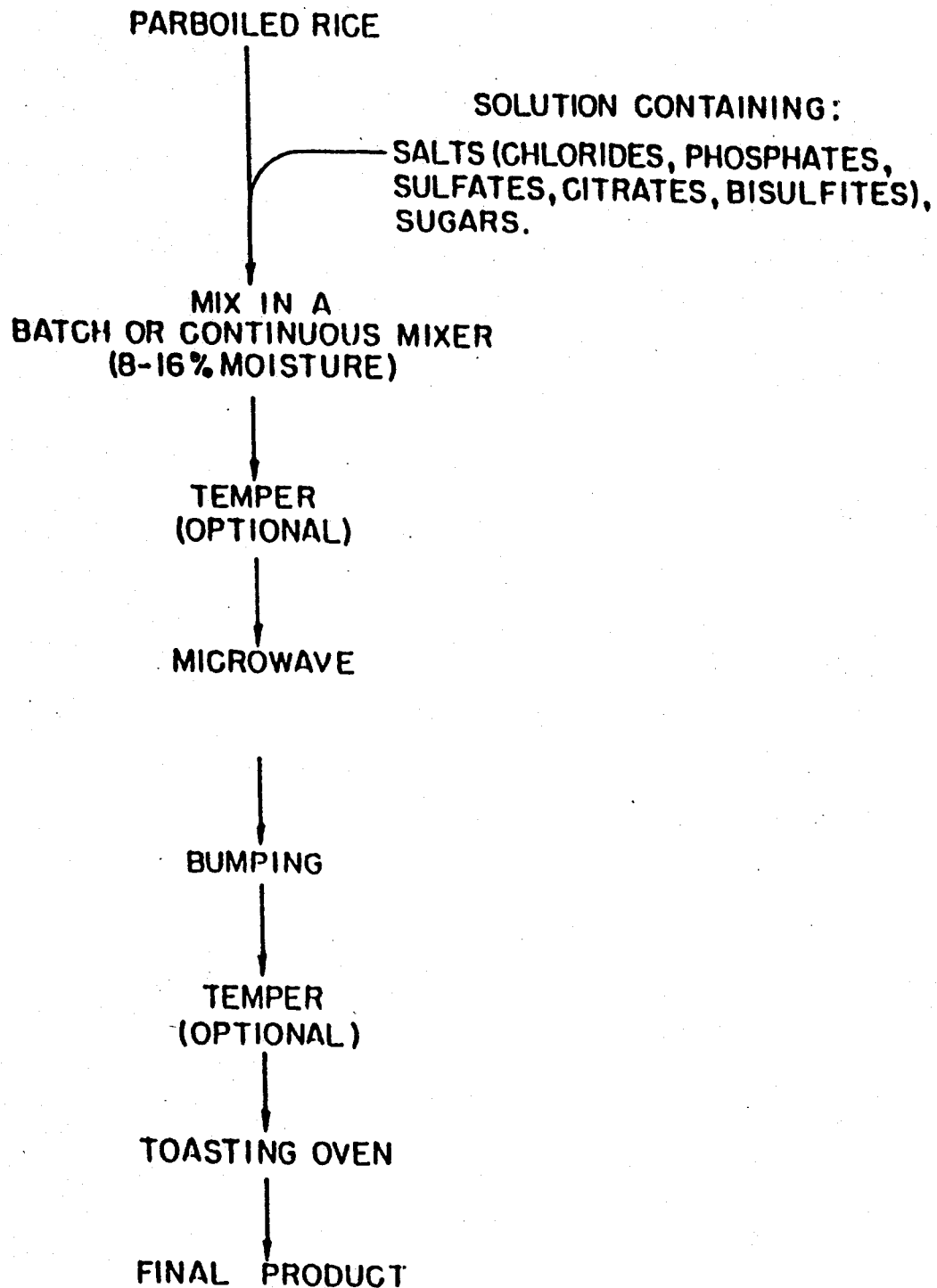
FIG. 1 schematically illustrates the process steps of the present invention.

The low moisture hot rolling process of the present invention contemplates the following steps:

(a) wetting parboiled grain to a moisture content of between 8%–16%;

(b) optionally tempering the moistened grain to allow uniform distribution of moisture;

(c) plasticizing the moistened grain;

(d) compressing the moistened grain to reduce kernel thickness; and (e) toasting the compressed grain to obtain an improved expanded grain product.

When the rice is toasted, two phenomena occur simultaneously. The temperature of the rice increases and the moisture inside the grain diffuses to the surface and evaporates. When the heat penetration rate (energy transfer rate) is much greater than the moisture diffusion rate (mass transfer rate), the moisture retained inside the rice will remain in a liquid state even after the rice has been heated to above 100° C. The physical limitation of the rice structure prohibits water from boiling; therefore, the temperature of the retained water can exceed 100° C. During toasting, the vapor pressure of the water increases but the rice structure weakens with increasing rice temperature. When the rice is heated to a high enough temperature, the water vapor pressure overcomes the rice structure. Without the physical restraint, the superheated water immediately vaporizes to expand the rice kernel which results in a honey-comb like structure. The temperature at which the rice structure failure occurs is a function of rice moisture content.

In order to produce good expansion during oven toasting, a sufficient amount of superheated water must be retained until the failure of the rice structure. The prior art achieves expansion by bumping the grain and partially drying the cooked and bumped high moisture grain. Bumping the grain to reduce rice thickness increases the heating rate, thus increase the amount of superheated water retained. Partial drying of the bumped high moisture grain allows the swollen starch gel to collapse forming a continuous dense glass which retains water during toasting. Another purpose of partial drying is to reduce the moisture level of the grain to a level suitable for toasting. If the rice contains more than optimum moisture (> about 15%), rice will crack and form a porous structure when toasted. The cracks and porous structure allow moisture to escape before the rice reaches the desired temperature. If the partially dried rice contains too little moisture (< about 11%), there is not enough superheated water to obtain the optimum expansion when the rice structure fails. The partial drying results in the formation of a dry crust which is weakened by absorption of moisture. This is why partially dried rice must be held for several hours to allow moisture redistribution prior to toasting.

In accordance with the present invention, it has been discovered that the inclusion of as little as 0.2% sugar, e.g., corn syrup in the tempering solution is sufficient to produce a significant effect on the expansion and the texture of the crisped rise. Without wishing to be bound to a particular theory, the data obtained suggests that the added syrup seals the cracks in the parboiled rice thus improving expansion. Additionally, it seems that the added sugars stimulate salivation and accelerate the rehydration of the starch gel during consumption, thus improving the eating quality of the crisped products.

In crisp rice manufacturing, the partially dried cooked rice is toasted to induce expansion, and formation of a tender honey-comb like structure. FIG. 1 illustrates the present process for producing an expanded rice product. The process involves wetting parboiled rice with a solution to a moisture content of between 8% and 16% and preferably between about 11% and 15%. The moistened rice is tempered to allow uniform distribution of moisture. Tempering time in function of tempering temperature. Tempering temperature in preferably between 70° and 90° C. and tempering time is preferably less than 30 minutes. Optionally, the tempering and wetting step can be performed at the same time. The tempered rice is then plasticized by using thermal or microwave energy. The required plasticizing temperature is a function of the moisture content of the rice. The preferred plasticizing temperature for grain is about the 13%–14% moisture content range is at least 80° C. The plasticizing step is carried out in such a way so that no severe loss of moisture occurs during heating. The kernels are compressed at a temperature of 65° C. to 100° C. The plasticized rice is thereafter bumped to reduce kernel thickness, optionally tempered, and then toasted. The preferred rolling temperature at the 13%–14% moisture content range is about 80° C. Present experimental data indicate that the degree of expansion is inversely proportional to the spacing of the compression rollers in the bumping process. The effect of roll spacing on the expansion of rice levels off when the roll spacing is smaller than about 0.15 mm. The spacing between the compression rollers is preferably about 0.16 mm but a range of about 0.14 to about 20 mm is satisfactory. Preferred roll spacing, however, will vary with the size of the raw material and the type of product desired.

The present invention is unique from the process of the prior art in several respects. Initially, the present process directly adds a tempering solution to the parboiled grains to adjust the moisture content. The prior art employs a long steaming step. Additionally, the moisture content of the parboiled rice is only increased to a moisture content of less than 16%, a level lower than taught by the prior art. The present process also has eliminated the necessity of employing enzyme(s) in the tempering solution.

Further, the present process employs various salts and sugars not only for flavor, but also to enhance the expansion and eating quality of the crisped rice. The salts and sugars are preferably added during the moisture adjustment step but they may be added later in the process. It has been discovered that salts containing lyotropic ions improve expansion. Lyotropic ions refer to a series of ions capable of enhancing the water structure. Also, the inclusion of sugars in the tempering solution influence the perception of crisped rice tenderness but not the physical textural strength as indicated by Instron analysis.

Another unique feature of the present invention is that the grain is bumped at a moisture content which is suitable for immediate toasting, thus there is no need to partially dry the grain prior to toasting. The prior art suggests that rolling treatment at certain temperatures, e.g., hot rolling in U.S. Pat. No. 1,990,382, or cold rolling in Australian patent Publication Number 86/05953, somehow alters starch structure and improves expansion. However, it has been discovered, in accordance with the present invention, that the function and efficacy of bumping is not to alter starch structure, but to reduce grain thickness.

Therefore, according to the present invention, rice is bumped at a moisture content suitable for immediate toasting. This eliminates the long drying and subsequent resting (upwards of 10 hours) required by the prior art. The present inventors view the rice kernel as a polymer blend and utilize heat and water, which is a plasticizer in this polymer system, to soften the rice so that is can be rolled to reduce its thickness at a fairly low moisture content, preferably about 11 to 16%. Surprisingly, the utilization of this plasticizing system permits bumping at a moisture content which is substantially lower than that employed by the prior art, thereby reducing or eliminating required drying time prior to toasting. The present process requires less than 30 minutes rest time while the prior art requires no less than 15 hours, i.e., less than about 3% of conventional resting time. (The term rest time means the equilibration time between the partial drying treatment and the toasting step).

The time and energy savings inherent in the present process are surprisingly substantial when compared to the requirements of the prior art.

EXAMPLE 1

Effect of Rice Thickness and Particle Size on the Bulk Density of The Crisped Rice The prior art suggests that bumping the grain with intermediate moisture somehow affects the rice (starch) structure, the improving expansion. In order to demonstrate that the function and efficacy of bumping or compressing rice is primarily to reduce rice thickness, the following experiment was performed.

Rice was cut in half to reduce rice thickness to produce the substantially same kind of effect as compressing the rice.

Parboiled rice was tempered overnight then manually sliced into two pieces. The cut rice was air dried overnight then toasted using a popcorn popper. It was found that the cut rice expanded more than the whole rice (uncut), but did not expand as much as rolled or compressed rice (see Table 1).

It was determined that the cut rice had a smaller particle size and packed better when measuring the bulk density. Also, it was observed that the sharp ends of the cut rice did not expand, presumably because too much moisture was lost during overnight drying. The cold rolled rice was then manually cut to determine the effect of particle size on the expansion of crisped rice. It was found that reducing the particle size increased the bulk density of the crisped rice.

Because the bulk density of the rolled cut rice is essentially the same as that of cut rice, the test results support the conclusion that the function of compressing the rice is primarily to reduce kernal thickness.

If the primary function of rolling the grain is to reduce kernal thickness, then rolling temperature should not produce any effect on the crisped rice quality as suggested by the prior art.

Accordingly, the parboiled rice was tempered to 23% moisture then steamed for 40 min at 95° C. The temperature of the steamed rice was taken then the rice was immediately rolled. The rolled rice was air dried overnight then crisped. The hot rolled rice expanded less than the cold rolled rice (see Table 2).

It was observed that the hot rolled rice was much thicker than the cold rolled rice. Previous research indicated that the thickness adversely affects the expansion of crisped rice. Also, the steaming treatment causes excessive hydration of the rice surface and cracking, and the formation of a porous structure when the rice is dried. The formation of cracks reduces expansion. The void in the dry starch gel is like an air bubble trapped in the extruder which causes uneven expansion of the starch cell. This explains why there are blisters on the surface of Kellogg's Rice Krispies. The data that steaming the rice and then drying the high moisture rice, two processing steps used in all of the published crisp rice making methods, cause detrimental effects on the quality of the crisped rice.

Figure 2:
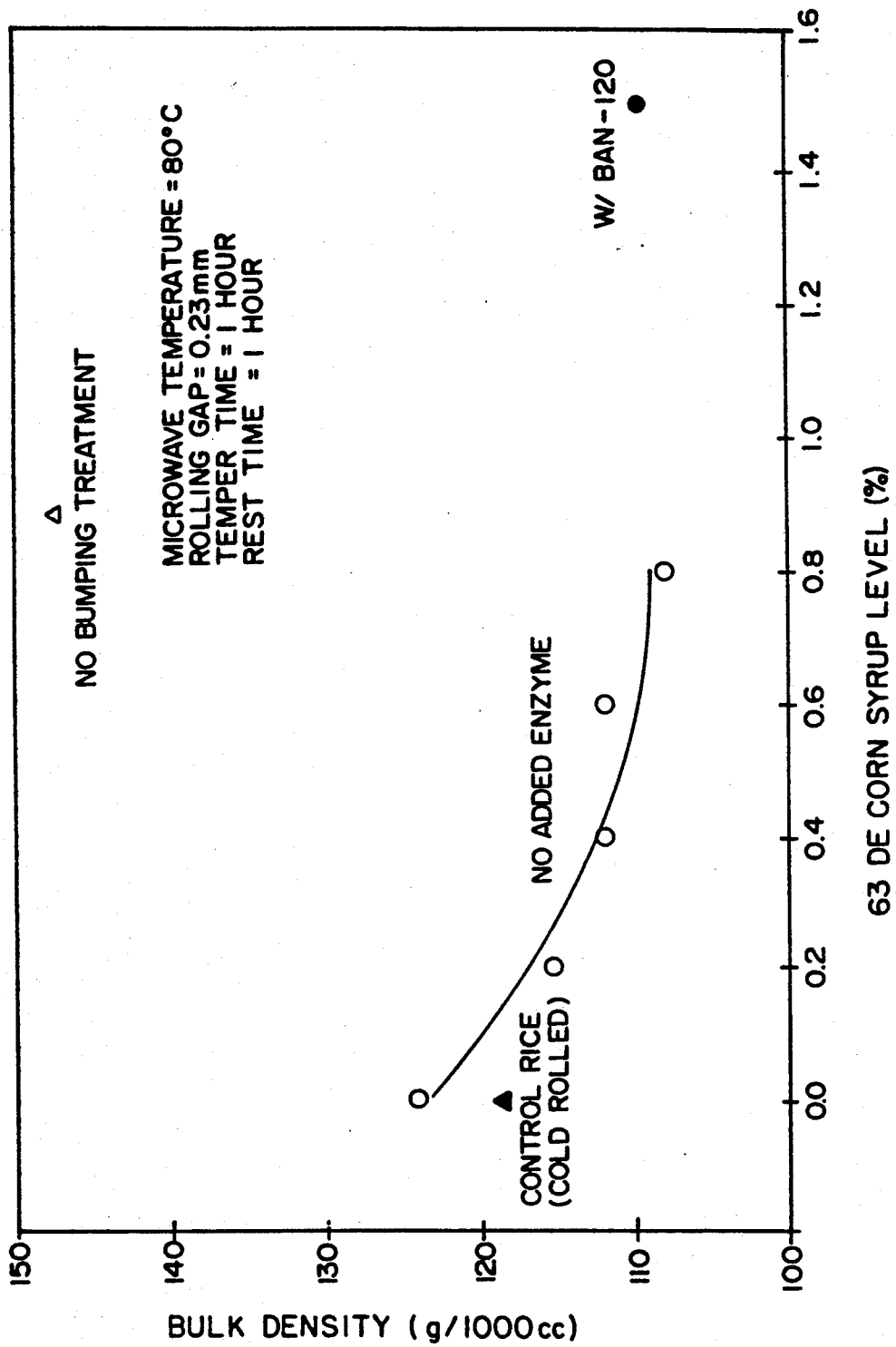
FIG. 2 graphically depicts the effects of enzyme addition to a solution containing 1.5% 63 DE corn syrup on the bulk density of the final product.
Figure 3:
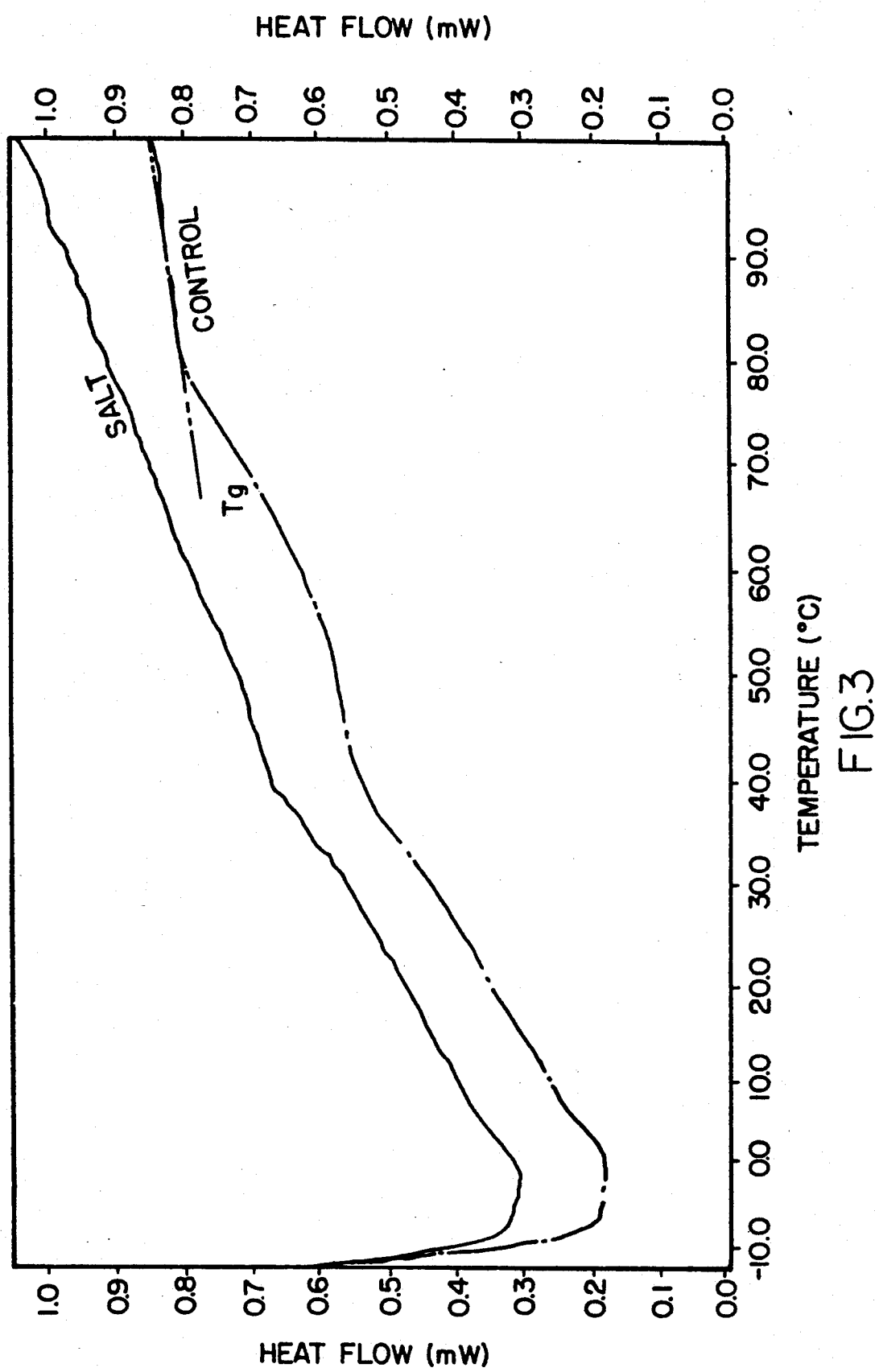
FIG. 3 is a graphical illustration of the effect of salt on the glass transition temperature (Tg) of rice starch.

To further test the effect of rolling temperature on crisped rice quality, the following test was performed. Parboiled rice was tempered to various moisture contents and placed in mason jars. The tempered rice was incubated at 80° C. for about 16 hrs and then rolled. The rice temperature was about 70° C. after incubation. The rolled rice was dried at ambient temperature overnight. The purpose of incubating the rice was to heat (plasticize) the rice without causing excessive hydration. According to polymer science, the plasticity of rice is a function of temperature and moisture content. Compared to the control which is rice prepared according the International Patent No. WO86/05953 (hereinafter "Control Rice") less moisture is employed in the hot rolling process to avoid the formation of a porous structure. It is suspected that the surface layers of the hot rice surface will dry fairly quickly causing the formation of fissures and a porous structure. The porosity of the surface layer is expected to be proportional to the moisture content. If the moisture is low, the rice may not have enough plasticity at 70° C. thus forming cracks when rolled. Also, the moisture content remaining in the dried rolled rice may be too low after overnight drying. Therefore, hot rolling an optimum moisture rice should produce a good quality crisped rice. Experimental data confirmed that moisture content higher or lower than the optimum level will reduce expansion (see Table 2). The hot rolled rice had a slightly higher bulk density than the control rice (see FIG. 2). This may be due to the fact that the hot rolled rice is dried at a higher rate than the control rice. When the cold rolled rice was dried in a forced air oven at 175° F. the bulk density of the resultant crisped rice was higher than hot rolled rice (see Table 2 and Table 3).

The results indicate that heat can be used to plasticize a low moisture rice. Microwave energy may be able to heat the rice to a desirable temperature in very short time without causing serious surface hydration or dehydration. Because the rolled rice is already at a moisture content suitable for crisping, the drying step and the following resting time can be eliminated. A bag of tempered rice (containing 1.5% NaCl, 0.1% Ban 120, and 13% moisture) was microwaved to increase the rice temperature to 80° C. The rice was rolled while hot and toasted 20 min after rolling. The bulk density of the hot rolled crisped rice was essentially the same as Control rice (see Table 3).

EXAMPLE 2

Effect of Rolling Temperature and Moisture

In order to demonstrate that optimum rolling temperature is a function of moisture content the following experiment was conducted.

When pressed, the plasticized rice starch deforms. Because the strain rate is a function of viscosity, it is affected by temperature and moisture content. When the temperature is just a few degrees above Tg (glass transition temperature), the polymer is still very viscous. Therefore, the polymer will fail when subjected to rapid compression. If the rice temperature or moisture content is not high enough, the rice will crack when rolled, resulting in a reduction in expansion. The parboiled rice was tempered overnight to various moisture contents (NaCl was omitted). The tempered rice was microwaved to 55° C. or 80° C. then rolled. We found that the rice containing only 12% moisture expanded much less than the 13% moisture sample (see Table 4).

This finding indicates that the optimum rolling temperature is a function of moisture content. For rice containing 13% moisture, heating the rice to a higher temperature (80° C.) substantially reduced the degree of cracking but did not produce much effect on expansion. It is theorized that this is because rice lost too much moisture when it was microwaved to 80° C. Considerable moisture condensation was observed in the plastic bag. The parboiled rice was tempered to various moisture contents using a solution containing 1.5% 63 DE corn syrup and 1.5% NaCl. The rice was microwaved to 80° C., rolled and toasted after 30 min testing. Table 5 shows the test results.

The optimum moisture content is between 11.6% to 12.8%. Thus, the optimum tempering moisture should be 12.8% plus the amount lost during microwave treatment, about 1%-2%. The omission of salt from the tempering solution decreased the microwave efficiency by about 25%. The omission of salt (NaCl) substantially increased the bulk density of the crisped rice. This finding indicates that the function of the added salt is more than just a flavoring agent in our system.

EXAMPLE 3

Effect of Lyotropic Salts on the Expansion of Crisped Rice

Equal weights of $Na_2SO_4$, $Na_2HPO_4$, $CaCl_2$, and Na-citrate were used to replace NaCl to determine their effect on the expansion of crisped rice. All the lyotropic ions were effective in improving the expansion and texture but impaired the taste of the crisped rice (see Table 2). The crisped rice containing $CaCl_2$ had a very noticeable bitter taste. Our panels responded very differently to the lyotropic salts (except $CaCl_2$). They could not agree on which salts gave an undesirable taste. For the salts we tested, two out of five panel detected noticeable undesirable taste. However, the panel agreed that the one containing NaCl tasted best.

It was observed that the inclusion of salts in the tempering solution improves microwave efficiency thereby causing the grain to be heated at a faster rate. As a result, the grain can be heated to the desirable rolling temperature without a significant loss of moisture from the grain surface. When moisture loss from the grain surface is severe, the grain is more likely to crack during rolling, thereby reducing expansion.

Lin, Y. E. and Anantheswaran, R. C. Journal of Food Science 53(6):1746 (1988) reported that (NaCl) improve the expansion of microwave popcorn. The authors, however noted that the beneficial effects could not be accounted for by change of heating rate alone, and that an unknown complex mechanism is involved.

Gough, B. M. and Pybus, J. N., Starke 25(4):123(1973) reported that the effectiveness of salts on reducing the gelatinization temperature parallel the lyotropic salt sequence. Many theories have been proposed to explain the effect, but none of them can explain all the observations. According to the inequilibrium melting theory proposed by Levine, H., and Slade, L., 1988 Carbohydrate Polymers, 8:183 (1988), Tg of starch has to be suppressed to lower the gelatinization temperature. It is possible that the lyotropic salts suppress the Tg of starch, thus altering the rheology of the starch gel and improving expansion. Glass transition is the transformation of a glassy material (super cooled liquid) to a viscoelastic rubber state. Glass transition temperature is generally defined as the middle point of the temperature range where dH/dT becomes discontinuous (the heat capacity of a material changes). Differential Scanning Calorimeter (DSC) Was used to document the effect of salt on the Tg of rice starch (see Table 3). It is observed that the rice flour with added salt (NaCl) did not show any apparent glass transition but the control did.

EXAMPLE 4

Effect of Tempering Time and Rest Time

The parboiled rice was tempered to 13% moisture and allowed to equilibrate under room temperature or 50° C. for various lengths of time. The bagged tempered rice was microwaved to 50° C. before it was placed into the hot room. The tempered rice was microwaved to 80° C. then rolled. The rolled rice was toasted in 30 min except for those which had been tempered for 4 hrs at room temperature. The rice receiving 4 hours tempering at room temperature was allowed to rest for various amount of time before toasting. Table 5 and Table 6 show the results.

The data indicates that at least 1 hour tempering and 30 minute rest time are required for maximum expansion. However, experienced panels pointed out that 20 minutes tempering was sufficient to produce acceptable product.

EXAMPLE 5

A tempering solution containing 1.5% NaCl, 1.5% 63 DE corn syrup and 0.15% Ban 120 from NOVO (based on dry rice weight) were added to whole parboiled rice to increase the moisture content to 13%. The wetted rice was placed in a sealed plastic bag and held at 50° C. for 20 minutes. The tempered rice was microwaved to 80° C. and immediately rolled using a pair of smooth rolls without differential. The bumped rice was placed in an open tray to rest for one hour before toasting. The rice was toasted using a Creitor popcorn popper at 475° F. for 35-45 seconds. The bulk density of the resultant product was 102.7 g/1000 cc. The bulk density is measured by filling a graduated cylinder with a known weight of crisped rice and tapping the cylinder until no further compaction occurs. This product was crisp and friable. Our later research showed that the added enzyme had no effect on the crisped rice quality; therefore, it can be eliminated from the tempering solution.

EXAMPLE 6

Adequate amounts of tempering solutions containing 1.5% 42DE corn syrup, 0.1% Ban 120, and 1.5% of sodium citrate, disodium phosphate, sodium sulfate, calcium chloride or sodium chloride was added to the parboiled rice to adjust rice moisture content to 13%.

The rice was tempered overnight at room temperature in a sealed plastic bag. The tempered rice was microwaved to 80° C. then rolled. The rolled rice was allowed to rest in an open pan for 1 hour then toasted. The crisped rice containing sodium chloride, disodium phosphate, sodium sulfate, calcium chloride, and sodium citrate was 101.8, 102.6, 106.1, 112.0 and 106 g/1000 cc, respectively. All crisp rice samples were tender and friable.

EXAMPLE 7

Tempering solutions containing 1.5% NaCl, water and various levels of 63DE corn syrup were added to the parboiled rice to adjust the moisture content to 13%. The wetted rice were tempered 1 hour at room temperature in a sealed plastic bag. The tempered rice samples were microwaved to 80° C. and bumped immediately. The rolled (bumped) rice was allowed to rest in an open pan for 1 hour then toasted at 475° F. The bulk densities of crisped rice containing 0, 0.2, 0.4, 0.6, and 0.8% 63 DE corn syrup were 124.1, 115.3, 111.9, 112.0, 108.0 g/1000 cc, respectively. Crisp rice without added syrup was crisp but slightly tough. Addition of 0.2% corn syrup produces significant improvement in expansion and eating quality.

TABLE I
EFFECT OF ROLLING AND CUTTING ON THE BULK DENSITIES OF CRISP RICE

| TREATMENT | BULK DENSITY *(G/L) |
|---|---|
| WHOLE RICE (NO TREATMENT) | 215 |
| CUT RICE | 176 |
| COLD ROLLED RICE | 157 |
| COLD ROLLED RICE | 155 |
| ROLL THEN CUT | 177 |

*All rice was toasted using a home popcorn popper

TABLE 2
BULK DENSITY OF CRISP RICE FROM HOT ROLLING PROCESS

| TREATMENT | BULK DENSITY *(G/L) |
|---|---|
| WHOLE RICE (NOT ROLLED) | 131.0 |
| COLD ROLLED (CONTROL RICE) | 95.7 |
| HOT ROLLED (STEAMED) | 118.6 |
| COLD ROLLED (CONTROL RICE) | 92.1 |
| 13% MOISTURE (INCUBATED AT 80° C.) | 108.6 |
| 15% MOISTURE (INCUBATED AT 80° C.) | 100.6 |
| 17% MOISTURE (INCUBATED AT 80° C.) | 115.3 |
| 19% MOISTURE (INCUBATED AT 80° C.) | 119.5 |

TABLE 3

| TREATMENT | BULK DENSITY (g/L) | EATING QUALITY |
|---|---|---|
| Control Rice (ambient dried) | 92.1 | crisp and tender |
| Control Rice (dried @ 175° F.) | 110.0 | crisp and tender |
| Microwave (w/ BAN 120) | 103.7 | crisp and tender (but tougher than Control Rice) |
| Microwave (w/o enzyme or syrup) | 113.2 | crisp but slightly tough |
| Microwave (1.5% 63DE syrup no enzyme) | 96.3 | crisp and tender (like Control Rice) |

TABLE 4

| ROLLING TEMPERATURE | SYRUP | SALT | BULK DENSITY (g/L) |
|---|---|---|---|
| 80° C. | — | NaCl | 107.2 |
| 55° C. (13% m.o.) | — | — | 128.8 |
| 55° C. (12% m.o.) | — | — | 141.6 |
| 80° C. | — | NaCl | 105.8 |
| 80° C. | — | — | 126.1 |
| 80° C. | 42 DE | NaCl | 101.8 |
| 80° C. | 42 DE | Na2HPO4 | 102.6 |
| 80° C. | 42 DE | Na-Citrate | 106.0 |
| 80° C. | 42 DE | Na2SO4 | 106.1 |
| 80° C. | 42 DE | CaCl2 | 112.0 |

TABLE 5

| REST TIME (min) | BULK DENSITY (g/L) | EATING QUALITY |
|---|---|---|
| 0 | 106.15 | Crisp and Friable, but slightly tougher than Control Rice |
| 30 | 103.54 | Crisp and Friable* |
| 60 | 101.68 | Crisp and Friable* |

*RATED NEARLY EQUAL OR EQUAL TO CONTROL PROCESSED RICE

TABLE 6

| TIME (hr) | TEMPERATURE (°C.) | BULK DENSITY (g/L) | EATING QUALITY |
|---|---|---|---|
| 0.3 | 22 | 103.79 | Crisp but not Friable |
| 0.3 | 50 | 102.71 | Crisp and Friable, but tougher than Control Rice |
| 1.0 | 22 | 103.59 | Crisp and Friable, but tougher than Control Rice |
| 1.0 | 50 | 102.02 | *Crisp and Friable |
| 2.0 | 22 | 105.38 | Crisp and Friable, but tougher than Control Rice |
| 2.0 | 50 | 100.74 | *Crisp and Friable |
| 4.0 | 22 | 101.68 | *Crisp and Friable |
| 4.0 | 50 | 100.51 | *Crisp and Friable |

*Rated nearly equal to Control Rice

What is claimed is:

1. A low moisture hot rolling process for preparing expanded grain products consisting essentially of:
   a. uniformly wetting parboiled grain to a moisture content of between about 8% to 16%;
   b. plasticizing the moistened grain at a temperature of from 50° C. to 100° C. whereby no sever loss of moisture occurs during heating;
   c. compressing the plasticized grain at a moisture content of 11% to 15% and a temperature of 65° C. to 100° C.; and
   d. toasting the compressed grain to obtain an expanded grain product.

2. The process of claim 1 which further comprises tempering the moistened grain of step (a) to insure uniform distribution of moisture.

3. The process according to claim 1 wherein microwave energy is employed to plasticize the low moisture grain.

4. The process according to claim 1 wherein heat energy is employed to plasticize the low moisture grain.

5. The process according to claim 2 wherein the parboiled grain is tempered with an aqueous solution containing edible dissolved sugars and salts.

6. The process according to claim 5 wherein said edible sugars are corn syrups, glucose, fructose, lactose, maltose, galactose, xylose, sucrose or mixtures thereof.

7. The process of claim 5 wherein said edible salts are phosphates, citrates, chlorides, sulfates or mixtures thereof.

8. The process of claim 2 wherein the grain is tempered after said compression and prior to toasting.

9. The process according to claim 1 wherein the parboiled grain is wetted to a moisture content of between about 11%–15%.

10. The process according to any one of claims 1 to 9 wherein the grain is allowed to stand less than about one hour prior to toasting.

11. A process according to claim 1 wherein said grains are compressed by passing the grains between compression rollers.

12. The process of claim 11 wherein the spacing between said compression rollers is between about 0.14 to 0.20 mm.

13. A process according to claim 5 wherein at least one salt is added to the tempering solution prior to the plasticizing step.

14. A process according to claim 1 wherein the low moisture grain is rice.

15. The expanded grain products produced by a process according to claim 1.

16. A process according to claim 11 wherein the low moisture grains are compressed at temperatures of between about 50° and about 100° C.

17. A low moisture hot rolling process for preparing expanded grain products consisting essentially of;
   a. wetting the parboiled grain to a moisture content of between about 11% to 15%;
   b. tempering the moistened grain to allow uniform distribution of moisture;
   c. plasticizing the moistened grain to a temperature of from 50° C. to 100° C. by microwave energy whereby no severe loss of moisture occurs during heating;
   d. compressing the plasticized grain at a moisture content of 11% to 15% and a temperature of 65% to 100° C. to reduce kernel thickness;
   e. allowing the compressed grain to stand less than about one hour prior to toasting; and
   f. toasting the low moisture grain product.

18. A process according to claim 17 wherein at least one lyotropic salt is added to the tempering solution prior to the plasticizing step.

19. The expanded grain product produced by the process of claim 17.

20. A process according to claim 17 wherein the low moisture grain is rice.

21. A process according to claim 17 wherein the low moisture grains are compressed at a temperature of between about 50° and about 100° C.

22. The process of claim 17 wherein the parboiled grain is wetted with an aqueous solution containing dissolved sugars and solutes.

23. The process of claim 22 wherein said salts are phosphates, citrates, chlorides, sulfates or mixtures thereof.

24. The process of claim 22 wherein said sugars are corn syrups, sucrose or mixtures thereof.

25. The process of claim 17 wherein the tempered grain is compressed by compression rolls with a spacing gap of between about 0.14 to 0.20 mm.

* * * * *